(12) United States Patent
Phan Huy (10) Patent No.: US 9,178,739 B2
(45) Date of Patent: Nov. 3, 2015

(54) METHOD OF WIRELESS COMMUNICATION WITH A MULTI-ANTENNA RECEIVER

(71) Applicant: ORANGE, Paris (FR)

(72) Inventor: Dinh Thuy Phan Huy, Paris (FR)

(73) Assignee: FRANCE TELECOM, Paris (FR)

( * ) Notice: Subject to any disclaimer, the term of this patent is extended or adjusted under 35 U.S.C. 154(b) by 0 days.

(21) Appl. No.: 14/397,399

(22) PCT Filed: Apr. 16, 2013

(86) PCT No.: PCT/FR2013/050833
§ 371 (c)(1),
(2) Date: Oct. 27, 2014

(87) PCT Pub. No.: WO2013/160582
PCT Pub. Date: Oct. 31, 2013

(65) Prior Publication Data
US 2015/0180697 A1     Jun. 25, 2015

(30) Foreign Application Priority Data

Apr. 27, 2012  (FR) .................................... 12 53922

(51) Int. Cl.
| | | |
|---|---|---|
| *H04B 7/06* | (2006.01) |
| *H04L 27/26* | (2006.01) |
| *H04B 7/08* | (2006.01) |
| *H04L 1/04* | (2006.01) |
| *H04L 1/06* | (2006.01) |
| *H04B 7/04* | (2006.01) |
| *H04L 27/36* | (2006.01) |
| *H04L 5/00* | (2006.01) |
| *H04L 25/02* | (2006.01) |

(52) U.S. Cl.
CPC ............ *H04L 27/2698* (2013.01); *H04B 7/046* (2013.01); *H04B 7/068* (2013.01); *H04B 7/0669* (2013.01); *H04B 7/0848* (2013.01); *H04L 1/04* (2013.01); *H04L 1/0625* (2013.01); *H04L 27/2666* (2013.01); *H04L 27/2691* (2013.01); *H04L 27/2697* (2013.01); *H04L 27/367* (2013.01); *H04L 5/0023* (2013.01); *H04L 25/0204* (2013.01)

(58) Field of Classification Search
CPC ..... H04B 7/0413; H04B 7/0456; H04B 5/003
USPC .................................. 375/260, 267, 299, 347
See application file for complete search history.

(56) References Cited

U.S. PATENT DOCUMENTS 8,687,726 B2 *   4/2014   De Rosny et al. ............ 375/267

OTHER PUBLICATIONS

International Search Report and Written Opinion dated Jul. 15, 2013 for corresponding International Application No. PCT/FR2013/050833, filed Apr. 16, 2013.

(Continued)

*Primary Examiner* — Kevin Kim
(74) *Attorney, Agent, or Firm* — David D. Brush; Westman, Champlin & Koehler, P.A.

(57) ABSTRACT

A method of transmitting data between a transmitter furnished with $M \geq 1$ transmission antenna(s) and a receiver furnished with $N \geq 2$ reception antennas, in which said data are coded using an OFDM/OQAM modulation having $L \geq 1$ subcarriers. The method combines a specific coding/decoding with a precoding by Time Reversal, which can be used in high speed radio communications.

11 Claims, 9 Drawing Sheets

(56) References Cited

OTHER PUBLICATIONS

Pierre Siohan et al., "Analysis and Design of OFDM/OQAM Systems Based on Filterbank Theory" IEEE Transactions on Signal Processing, IEEE Service Center, New York, NY, US, vol. 50, No. 5, May 1, 2002, XP011080136.

Chrislin Lele et al., "The Alamouti Scheme with CDMA-OFDM/OQAM" Eurasip Journal on Advances in Signal Processing, Jan. 18, 2010, pp. 1-13, XP002688650.

Hao Lin et al., "A Pseudo Alamouti Transceiver Design for OFDM/OQAM Modulation with Cyclic Prefix", Signal Processing Advances in Wireless Communications, 2009, SPAWC '09, IEEE 10th Workshop on, IEEE, Piscataway, NJ, USA, Jun. 21, 2009, pp. 300-304, XP031487837.

Vidar Ringset et al., "Performance of a Filterbank Multicarrier (FBMC) Physical Layer in the WiMAX Context", 2010 Future Network & Mobile Summit Jun. 16-18, IEEE, IEEE Piscataway, JJ, USA, Jun. 16, 2010, pp. 1-8, XP031921958.

Miquel Payaroi et al., "Performance Comparison Between FBMC and OFDM in MIMO Systems Under Channel Uncertainty", Wireless Conference (EW), 2010 European, IEEE, Piscataway, NJ, USA, Apr. 12, 2010, pp. 1023-1030, XP031688574.

English translation of the International Written Opinion dated Oct. 27, 2014 for corresponding International Application No. PCT/FR2013/050833, filed Apr. 16, 2013.

Bernard Le Floch et al: "Coded Orthogonal Frequency Division Multiplex", Proceeding of the IEEE, Jun. 1995, pp. 982-996, vol. 83, No. 6.

\* cited by examiner

METHOD OF WIRELESS COMMUNICATION WITH A MULTI-ANTENNA RECEIVER

CROSS-REFERENCE TO RELATED APPLICATIONS

This Application is a Section 371 National Stage Application of International Application No. PCT/FR2013/050833, filed Apr. 16, 2013, the content of which is incorporated herein by reference in its entirety, and published as WO 2013/160582 A1 on Oct. 31, 2013, not in English.

FIELD OF THE DISCLOSURE

The present invention relates to wireless communications, in particular radio communications according to the IEEE 802.11, IEEE 802.16, 3GPP LTE Advanced, and DVB standards.

More precisely, the invention relates to a data transmission system comprising a transmitter equipped with one or more transmit antenna(s), and a receiver equipped with at least two receive antennas. Such a system is termed SIMO (the initials standing for "Single Input Multiple Output") when the system comprises only a single transmit antenna, and MIMO (the initials standing for "Multiple Input Multiple Output") when the system comprises several transmit antennas.

BACKGROUND OF THE DISCLOSURE

Relative to SISO (the initials standing for "Single Input Single Output") systems comprising a single transmit antenna and a single receive antenna, the advantage of SIMO/MIMO systems is, by virtue of the spatial diversity of the propagation channel, that of improving the quality of data transmission by reducing the rate of transmission errors for a given transmission power. It is recalled in this regard that the so-called "spatial diversity" technique consists in simultaneously transmitting one and the same message on one or more transmit antennas, and then in appropriately combining the respective signals received on each of the receive antennas.

It is recalled moreover that so-called OFDM modulation (the initials standing for "Orthogonal Frequency Division Multiplexing") efficiently reduces the interference between data symbols. Moreover, OFDM is relatively fairly uncomplex to implement; in particular, OFDM signal modulation can be implemented in an efficient manner by means of an Inverse Fast Fourier Transform (IFFT), and the demodulation of an OFDM signal can be implemented in an efficient manner by means of a direct Fast Fourier Transform (FFT). However, OFDM modulation exhibits the drawback of being rather inefficient spectrally (because of the use of a "cyclic prefix").

Another modulation, called "OFDM/OQAM", has therefore been proposed which exhibits the advantage of being spectrally efficient (since it does not require any cyclic prefix, in contradistinction to OFDM), while circumventing (like OFDM) interference between symbols in a fairly uncomplex manner (the acronym OQAM stands for "Offset Quadrature Amplitude Modulation").

In particular, the article by P. Siohan, C. Siclet, and N. Lacaille entitled "Analysis and Design of OFDM/OQAM Systems Based on Filterbank Theory" (*IEEE Transactions on Signal Processing*, vol. 50 No. 5, pages 1170 to 1183, May 2002) shows how it is also possible to implement OFDM/OQAM modulation by means of an IFFT and OFDM/OQAM demodulation by means of an FFT. Unfortunately, the technique presented in this article relates specifically to an SISO system, and does not therefore make it possible to benefit from the spatial diversity of SIMO/MIMO systems.

SUMMARY

The present invention therefore relates to a method of wireless transmission, by a transmitter furnished with $M \geq 1$ transmit antenna(s), of data intended for a receiver furnished with $N \geq 2$ receive antennas, in which said data are transmitted by means of an OFDM/OQAM modulation comprising $L \geq 1$ sub-carriers. Said method of transmission is noteworthy in that, for at least one value of the integer l, where $0 \leq l \leq L-1$, said transmitter implements N steps, step number p, where $p = 0, 1, \ldots, N-1$, comprising the following sub-steps:

coding (E1_p) of a data vector $X^{(l)}$ with N real components into a coded data vector $W^{(l,p)} = \pi^{(p)}(A^{(l)}, X^{(l)})$, where $A^{(l)}$ is a predetermined coding vector with N non-zero components, the notation "U·V" designates the result of the term by term multiplication of two vectors U and V of the same length, and $\pi^{(p)}(U)$ designates the circular permutation by r places of the components of a vector U, where $r = p+c$ or $r = -p+c$, and c is a predetermined relative integer, and transmission (E2_p) of said coded data vector $W^{(l,p)}$ on each of the M transmit antennas on the sub-carrier l, with a Time Reversal precoding using an estimation $\hat{H}^{(l)}$ of the transfer matrix of the MIMO channel which links said transmitter to said receiver for the sub-carrier l and focusing the n-th component of the coded data vector $W^{(l,p)}$, where $n = 1, 2, \ldots, N$, on the n-th receive antenna.

Correlatively, the invention relates to a method of wireless reception by a receiver furnished with $N \geq 2$ receive antennas, in which the data received have been transmitted by means of an OFDM/OQAM modulation comprising $L \geq 1$ sub-carriers. Said method of reception is noteworthy in that, for at least one value of the integer l, where $0 \leq l \leq L-1$:

a) said receiver implements firstly N steps, step number p, where $p = 0, 1, \ldots, N-1$, comprising the following sub-steps:

determination (R1_p) of a received vector $Y^{(l,p)}$ with N real components, whose n-th component, where $n = 1, 2, \ldots, N$, is equal to the symbol associated with the sub-carrier l received on the n-th receive antenna, after OFDM/OQAM demodulation and extraction of the real part, and coding (R2_p) of said received vector $Y^{(l,p)}$ into a coded received vector $$Z^{(l,p)} = A^{(l)} \cdot (\pi^{(p)}(Y^{(l,p)})),$$

where $A^{(l)}$ is a predetermined coding vector with N non-zero components, the notation "U·V" designates the result of the term by term multiplication of two vectors U and V of the same length, $\pi^{(p)}(U)$ designates the circular permutation by r places of the components of a vector U, where $r = p+c$ or $r = -p+c$, and c is a predetermined relative integer, b) the receiver calculates (R3) a decodable vector $$F^{(l)} = \sum_{p=0}^{N-1} Z^{(l,p)}, \text{ and}$$

c) the receiver calculates (R4) a decoded data vector $T^{(l)}$ as follows:

$$T^{(l)} = S^{(l)} \cdot F^{(l)},$$

where $S^{(l)} = (R^{(l)})^{-1}$ and $R^{(l)}$ is the matrix of the equivalent MIMO channel between the transmitter and the receiver for the sub-carrier l, defined by $$F^{(l)} = R^{(l)} \cdot X^{(l)} + B^{(l)},$$

where $B^{(l)}$ is a thermal noise term.

The invention also relates to a method of wireless communication, comprising the steps of a method of transmission such as is described succinctly hereinabove, as well as the steps of a method of reception such as is described succinctly hereinabove, and in which said steps number p, where p=0, 1, ..., N−1, are synchronized between the transmitter and the receiver.

Indeed, it may be shown that the decoded data vector $T^{(l)}$ obtained as described succinctly hereinabove is (in the absence of channel distortions) equal to the data vector $X^{(l)}$ intended to be transmitted by the transmitter to the receiver.

Thus, the methods described succinctly hereinabove combine a coding/decoding specific to the invention with a precoding by Time Reversal. This combination according to the invention makes it possible to benefit from the advantages of OFDM/OQAM modulation, and in particular its spectral efficiency; it will be noted in this regard that N different codings of said vector $X^{(l)}$, which comprises N real components, are transmitted successively, so that one real item of data is transmitted, on average, per transmission and per sub-carrier. Moreover, the invention makes it possible to utilize the spatial diversity of MIMO systems. Finally, the implementation of said method of reception requires, advantageously, only relatively low complexity at the level of the receiver, whatever the number of transmit or receive antennas; in particular, the mathematical operations to be performed are of low complexity (circulations of matrices, matrix multiplications, and—only occasionally—matrix inversions).

By way of comparison, it will be possible to refer to the article by C. Lélé, P. Siohan and R. Legouable entitled "The Alamouti Scheme with CDMA-OFDM/QQAM" (*Eurasip Journal on Advances in Signal Processing*, No. 8, 2010), which proposes an application of OFDM/OQAM modulation to MISO systems (the initials standing for "Multiple Input Single Output") comprising two transmit antennas and a single receive antenna. This technique is based on particular codes, termed "Alamouti codes". Now, this technique causes interference between symbols (more precisely, it allows orthogonality between symbols in the real domain, but not in the imaginary domain), and the elimination of such interference may not be done in a simple manner. With a larger number of receive antennas (case of MIMO), the processing required to eliminate the interference caused by this technique would be still more complex.

Now, very advantageously, the combination according to the present invention of a specific coding/decoding (completely different from Alamouti codes) with a precoding by Time Reversal makes it possible to avoid any interference between the symbols obtained after decoding, and to do so whatever the number of transmit or receive antennas.

According to particular characteristics, said coding vector $A^{(l)}$ is such that all its components are equal to one another. As a variant, in the case where the number of receive antennas N is even, said coding vector $A^{(l)}$ is such that its components of even indices are equal to one another, and its components of odd indices are equal to one another and opposite to the components of even indices.

By virtue of these provisions, in the two variants hereinabove, the matrix of the equivalent channel $R^{(l)}$ is a circulant matrix, and its inversion can therefore be performed in a fairly uncomplex manner.

Correlatively, the invention relates to diverse devices.

It thus relates, firstly, to a wireless transmitter furnished with M≥1 transmit antenna(s), comprising means for transmitting data intended for a receiver furnished with N≥2 receive antennas by means of an OFDM/OQAM modulation comprising L≥1 sub-carriers. Said wireless transmitter is noteworthy in that, for at least one value of the integer l, where 0≤l≤L−1, it furthermore comprises means for:

coding, for p=0, 1, ..., N−1, a data vector $X^{(l)}$ with N real components into a coded data vector $W^{(l,p)} = \pi^{(p)}(A^{(l)}, X^{(l)})$, where $A^{(l)}$ is a predetermined coding vector with N non-zero components, the notation "U·V" designates the result of the term by term multiplication of two vectors U and V of the same length, and $\pi^{(p)}(U)$ designates the circular permutation by r places of the components of a vector U, where r=p+c or r=−p+c, and c is a predetermined relative integer, and transmitting, for p=0, 1, ..., N−1, said coded data vector $W^{(l,p)}$ on each of the M transmit antennas on the sub-carrier l, with a Time Reversal precoding using an estimation $\hat{H}^{(l)}$ of the transfer matrix of the MIMO channel which links said transmitter to said receiver for the sub-carrier l and focusing the n-th component of the coded data vector $W^{(l,p)}$, where n=1, 2, ..., N, on the n-th receive antenna.

The invention also relates, secondly, to a wireless receiver furnished with N≥2 receive antennas, comprising means for receiving data which have been transmitted by means of an OFDM/OQAM modulation comprising L≥1 sub-carriers. Said wireless receiver is noteworthy in that, for at least one value of the integer l, where 0≤l≤L−1, it furthermore comprises means for:

determining, for p=0, 1, ..., N−1, a received vector $Y^{(l,p)}$ with N real components, whose n-th component, where n=1, 2, ..., N, is equal to the symbol associated with the sub-carrier l received on the n-th receive antenna, after OFDM/OQAM demodulation and extraction of the real part, coding, for p=0, 1, ..., N−1, said received vector $Y^{(l,p)}$ into a coded received vector $$Z^{(l,p)} = A^{(l)} \cdot (\pi^{(p)}(Y^{(l,p)})),$$

where $A^{(l)}$ is a predetermined coding vector with N non-zero components, the notation "U·V" designates the result of the term by term multiplication of two vectors U and V of the same length, $\pi^{(p)}(U)$ designates the circular permutation by r places of the components of a vector U, where r=p+c or r=−p+c, and c is a predetermined relative integer, calculating a decodable vector $$F^{(l)} = \sum_{p=0}^{N-1} Z^{(l,p)}, \text{ and}$$

calculating a decoded data vector $T^{(l)}$ as follows:

$$T^{(l)} = S^{(l)} \cdot F^{(l)},$$

where $S^{(l)} = (R^{(l)})^{-1}$ and $R^{(l)}$ is the matrix of the equivalent MIMO channel between the transmitter and the receiver for the sub-carrier l, defined by $$F^{(l)} = R^{(l)} \cdot X^{(l)} + B^{(l)},$$

where $B^{(l)}$ is a thermal noise term.

The advantages offered by these devices are essentially the same as those offered by the correlative methods set forth succinctly hereinabove.

It will be noted that it is possible to embody these devices in the context of software instructions and/or in the context of electronic circuits.

The invention also relates to a wireless communication system comprising a wireless transmitter such as described succinctly hereinabove and a wireless receiver such as described succinctly hereinabove, said transmitter and said receiver being able to synchronize mutually.

The invention is also aimed at a computer program downloadable from a communication network and/or stored on a medium readable by computer and/or executable by a microprocessor. This computer program is noteworthy in that it comprises instructions for the execution of the steps of any one of the methods of wireless transmission, or methods of wireless reception, or methods of wireless communication set forth succinctly hereinabove, when it is executed on a computer.

The advantages offered by this computer program are essentially the same as those offered by the corresponding methods.

BRIEF DESCRIPTION OF THE DRAWINGS

Other aspects and advantages of the invention will become apparent on reading the description detailed hereinbelow of particular embodiments, given by way of nonlimiting examples. The description refers to the figures which accompany it, in which.

DETAILED DESCRIPTION OF ILLUSTRATIVE EMBODIMENTS

The present invention applies to a wireless communication system comprising a transmitter furnished with $M \geq 1$ transmit antenna(s), and a receiver furnished with $N \geq 2$ receive antennas. The transmission of data uses an OFDM/OQAM modulation comprising an arbitrary number $L \geq 1$ of sub-carriers.

We shall firstly recall the principle of OFDM/OQAM modulation.

To begin let us consider an OFDM modulation comprising an even number Q of sub-carriers. A signal transmitted s(t) transporting a complex QAM data symbol (the initials standing for "Quadrature Amplitude Modulation") per sub-carrier and per symbol time $T_0 = 1/F_0$, is then arranged in such a way that, for each pair of successive sub-carriers, it comprises:

on one of these sub-carriers, a time offset ("temporal shift") equal to $T_0/2$ on the imaginary part of a given QAM symbol, and on the other sub-carrier, one and the same time offset of $T_0/2$ on the real part of the same QAM symbol.

This signal transmitted can be written in the form $$s(t) = \sqrt{2} \sum_{l=0}^{Q-1} \sum_{j=-\infty}^{+\infty} a_{l,j} p\left(t - j\frac{T_0}{2}\right) e^{i 2\pi l F_0 t} e^{i\varphi_{l,j}} \quad (1)$$

where:
the integer l enumerates the sub-carriers, and the integer j enumerates the symbol times,
the real coefficients $a_{l,j}$ are defined on the basis of the real and imaginary parts of the QAM symbols $c_{l,j}$ as follows:

$$a_{2l',2j'} = \Re\{c_{2l',j'}\}, a_{2l',2j'+1} = \Im\{c_{2l',j'}\}, a_{2l'+1,2j'} = \Im\{c_{2l'+1,j'}\}, a_{2l'+1,2j'+1} = \Re\{c_{2l'+1,j'}\}, \quad (2)$$

where $\Re\{\ldots\}$ represents the extraction of the real part and $\Im\{\ldots\}$ represents the extraction of the imaginary part,
the phase shifts $\phi_{l,j}$ are equal to:

$$\varphi_{2l',2j'} = 0, \varphi_{2l',2j'+1} = \frac{\pi}{2}, \varphi_{2l'+1,2j'} = \frac{\pi}{2}, \varphi_{2l'+1,2j'+1} = 0, \text{ and} \quad (3)$$

and (3)
the "prototype function" p(t) is real and symmetric.

In the article by B. Le Floch, M. Alard and C. Berrou entitled "Coded Orthogonal Frequency Division Multiplex" (*Proc. IEEE*, vol. 83, pages 982 to 996, June 1995), which describes a category of modulations comprising, among others, OFDM/OQAM, the prototype function p(t) is chosen in such a way that its Fourier transform is zero outside of a frequency band of width $2F_0$. In the article by Siohan, Siclet and Lacaille mentioned hereinabove, the prototype function p(t) is chosen in such a way that it is zero outside of the time interval $$\left[-\frac{\lambda T_0}{2Q}, +\frac{\lambda T_0}{2Q}\right],$$

where λ is any strictly positive integer; if the time t is discretized into intervals of length $T_0/Q$ (average duration of sampling per QAM symbol) enumerated by the integer k, the support of the discretized prototype function p[k] is therefore of length λ.

In the case of an SISO system, Siohan, Siclet and Lacaille demonstrate that, to obtain an OFDM/OQAM transmission without interference between symbols or between subcarriers, the prototype function p(t) must satisfy the following orthogonality relation:

$$G_l(z)G_l^*(z^{-1}) + G_{l+Q/2}(z)G_{l+Q/2}^*(z^{-1}) = \frac{1}{Q} \text{ for } 0 \le l \le \frac{Q}{2} - 1, \quad (4)$$

where the asterisk designates the complex conjugate, and the z-transforms $$G_l(z) = \Sigma_k z^{-k} p[l+kQ] \quad (5)$$

are called "polyphase components of order Q" of the prototype function p[k].

Siohan, Siclet and Lacaille also demonstrate that OFDM/OQAM modulation can advantageously be implemented by means of an IFFT, and OFDM/OQAM demodulation can advantageously be implemented by means of an FFT.

Accordingly, the discretized signal $$s[k] \equiv \sqrt{\frac{T_0}{Q}} s\left(\left(k - \frac{\lambda-1}{2}\right)\frac{T_0}{Q}\right) = \quad (6)$$

$$\sqrt{2} \sum_{l=0}^{Q-1} \sum_{j=-\infty}^{+\infty} a_{l,j} p\left[k - \frac{jQ}{2}\right] e^{i\frac{2\pi}{Q}l\left(k - \frac{\lambda-1}{2}\right)} e^{i\varphi_{l,j}}$$

is rewritten in the form $$s[k] = \sum_{l=0}^{Q-1} \sum_{j=-\infty}^{+\infty} x_l^0[j] f_l\left[k - \frac{jQ}{2}\right], \quad (7)$$

where $$x_l^0[j] = a_{l,j} e^{i\frac{\pi}{2}j}, \quad (8)$$

and $$f_l[k] = \sqrt{2} \, p[k] e^{i\frac{2\pi}{Q}l\left(k - \frac{\lambda-1}{2} + \frac{Q}{4}\right)},$$

so as to exhibit this signal as a conventional sum of Q incoming signals $x_l^0[j]$ filtered respectively by a set of Q filters $$f_l\left[k - \frac{jQ}{2}\right]$$

belonging to a "bank of synthesis filters" $f_l[k]$.

Figure 1A:
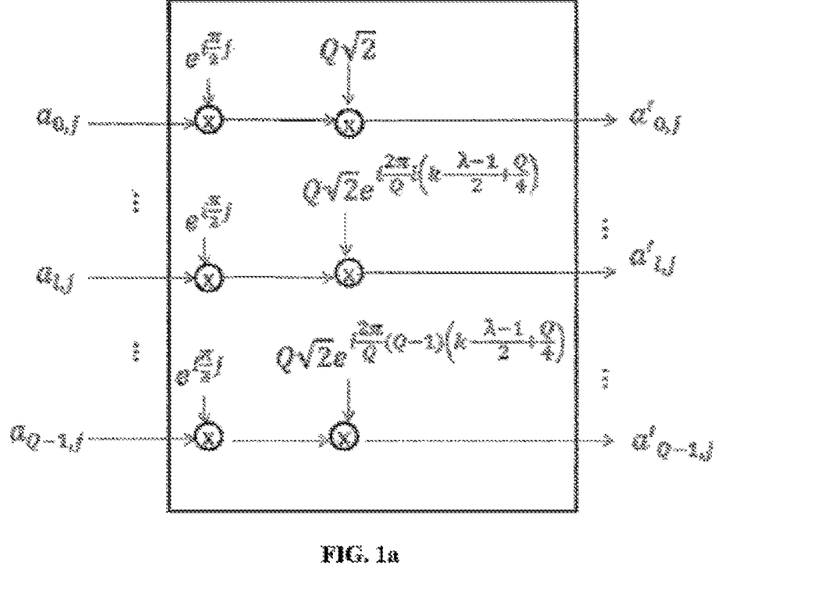
FIG. 1a illustrates a first step of a method of modulation/transmission of an OFDM/OQAM multiplex according to the state of the art.
Figure 1B:
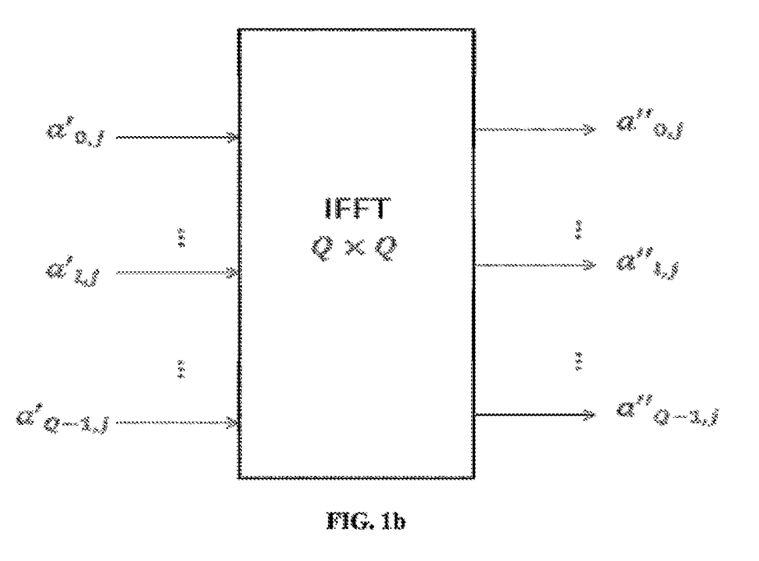
FIG. 1b illustrates a second step of a method of modulation/transmission of an OFDM/OQAM multiplex according to the state of the art.
Figure 1C:
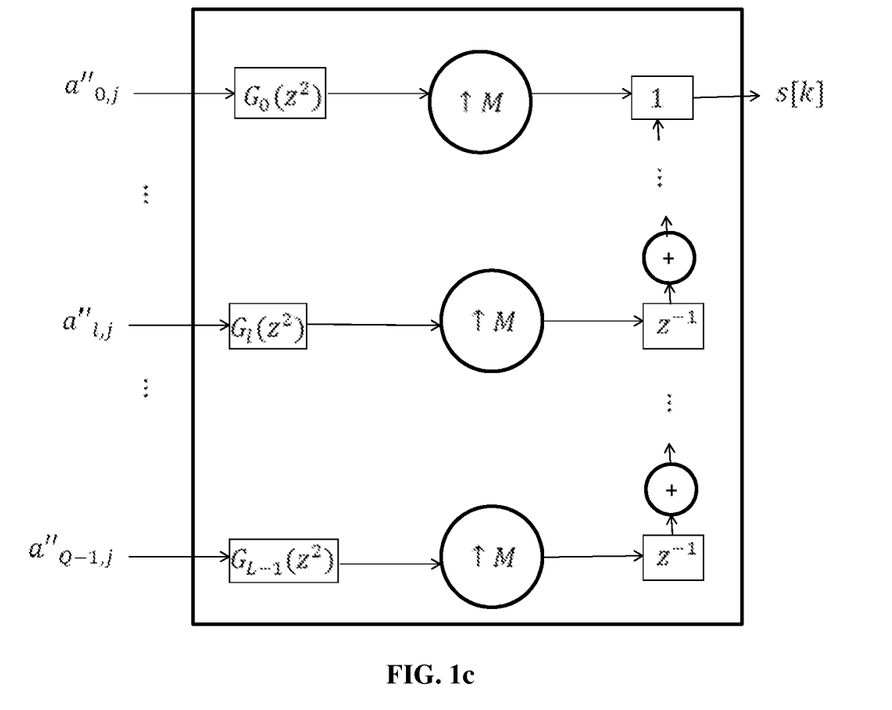
FIG. 1c illustrates a third step of a method of modulation/transmission of an OFDM/OQAM multiplex according to the state of the art, FIG. 2 summarizes the steps illustrated in FIGS. 1a, 1b and 1c.

After a few calculations, it is apparent that the OFDM/OQAM modulation/transmission consists essentially in applying during each symbol time number j to an incoming vector $[a_{0,j} \ldots a_{l,j} \ldots a_{Q-1,j}]^T$ (where the exponent "T" designates the transposition) the following operations:

each component $a_{l,j}$ is multiplied by a so-called "premodulation" factor equal to $$e^{i\frac{\pi}{2}j} Q \sqrt{2} \, e^{i\frac{2\pi}{Q}l\left(k - \frac{\lambda-1}{2} + \frac{Q}{4}\right)},$$

thereby giving a vector $[a'_{0,j} \ldots a'_{l,j} \ldots a'_{Q-1,j}]^T$ (FIG. 1a), this vector $[a'_{0,j} \ldots a'_{l,j} \ldots a'_{Q-1,j}]^T$ is subjected to an IFFT of dimension Q·Q, thereby giving a vector $[a''_{0,j} \ldots a''_{l,j} \ldots a''_{Q-1,j}]^T$ (FIG. 1b), - each component $a''_{l,j}$ of this vector $[a''_{0,j} \ldots a''_{l,j} \ldots a''_{Q-1,j}]^T$ is subjected to a filtering $G_l(z^2)$, and then to a factor expansion Q/2, and finally (except for l=0) to a delay of factor $z^{-1}$ with respect to the component $a''_{l-1,j}$; to finish, the resulting signals are summed (parallel→series transformation, denoted P/S) to give the signal s[k] (FIG. 1c).

Figure 2:
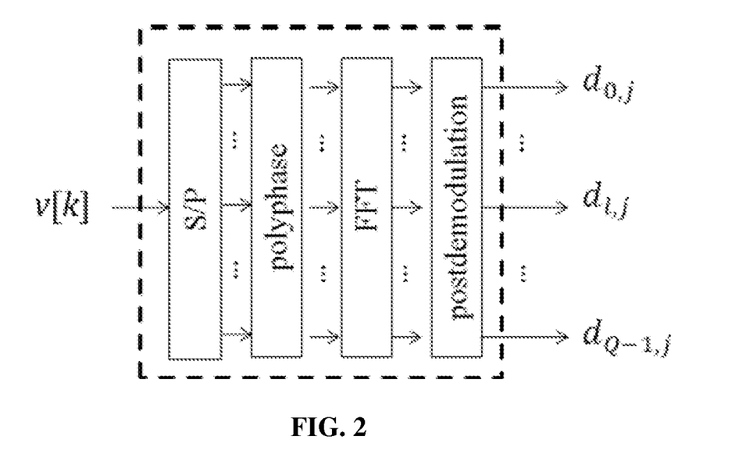

FIG. 2 summarizes the steps of modulation/transmission of an OFDM/OQAM multiplex which are described succinctly hereinabove.

It is possible to apply an analogous processing to the signal received v[k]. The demodulated signal $y_l[j]$ exiting on subcarrier number l at symbol time number j can be written in the form $$y_l[j] = \sum_{k=-\infty}^{+\infty} v[k] h_l\left[\frac{jQ}{2} - k\right], \text{ where} \quad (9)$$

$$h_l[k] = \sqrt{2} \, p[k] e^{i\frac{2\pi}{Q}l\left(k - \frac{\lambda-1}{2} - \frac{Q}{4}\right)}, \quad (10)$$

so as to make it apparent that the signal received v[k] is filtered by a set of Q filters $$h_l\left[\frac{jQ}{2} - k\right]$$

belonging to a "bank of analysis filters" $h_l[k]$.

Figure 3A:
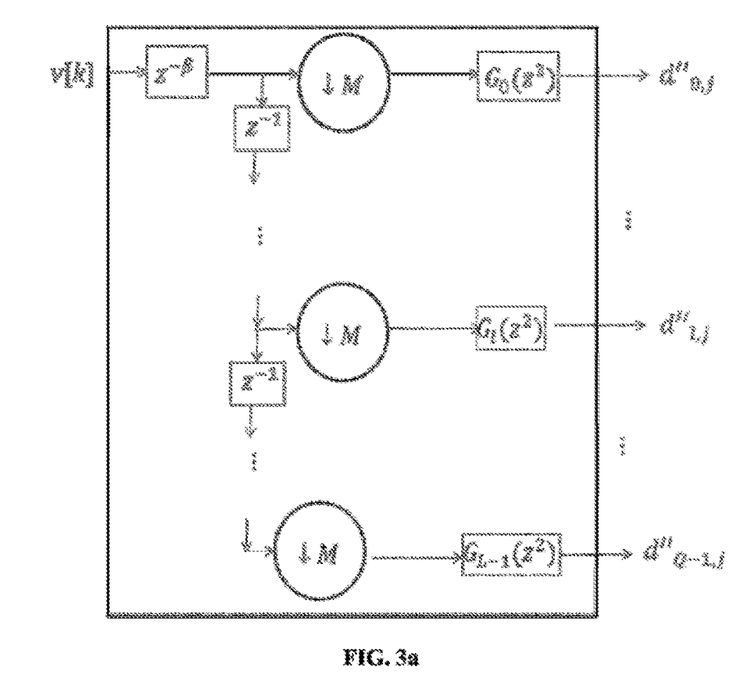
FIG. 3a illustrates a first step of a method of reception/demodulation of an OFDM/OQAM multiplex according to the state of the art.
Figure 3B:
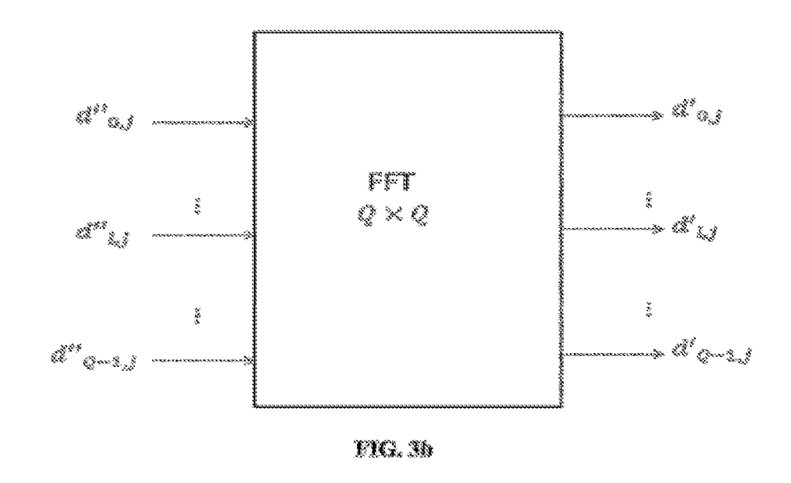
FIG. 3b illustrates a second step of a method of reception/demodulation of an OFDM/OQAM multiplex according to the state of the art.
Figure 3C:
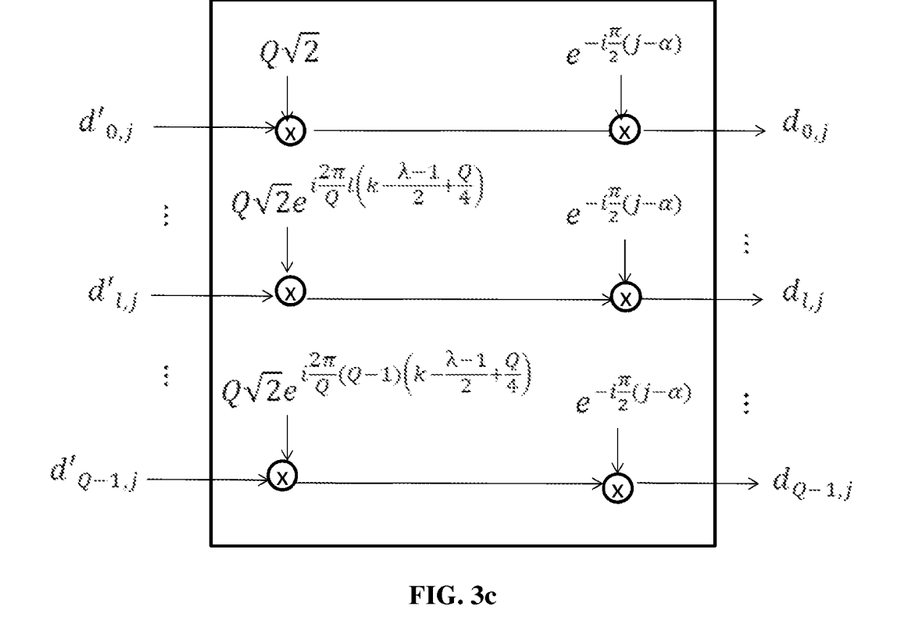
FIG. 3c illustrates a third step of a method of reception/demodulation of an OFDM/OQAM multiplex according to the state of the art, FIG. 4 summarizes the steps illustrated in FIGS. 3a, 3b and 3c, FIG. 5 schematically represents a circular permutation used by the invention, FIG. 6 schematically represents, according to an embodiment of the invention, the coding of a data vector associated with a sub-carrier of the OFDM/OQAM multiplex, so as to obtain a coded data vector.

After a few calculations, it is apparent that the OFDM/OQAM reception/demodulation consists essentially in applying to the signal received v[k] during each symbol time number j the following operations:

application of a delay of factor $z^{-\beta}$, where $\beta$ is the integer such that $$\beta \equiv \frac{\alpha Q}{2} - \lambda + 1, \quad (11)$$

with $$0 \le \beta \le \frac{Q}{2} - 1$$

and $\alpha > 0$ integer, and then decomposition of the signal thus obtained into a sum of Q components (series→parallel transformation, denoted S/P), each of these components (except for l=0) being firstly subjected to a delay of factor $z^{-1}$ with respect to the previous component, and then decimated by a factor Q/2, and finally subjected to a filtering $G_l(z^2)$ to give the component $d''_{l,j}$ of a vector $[d''_{0,j} \ldots d''_{l,j} \ldots d''_{Q-1,j}]^T$ (FIG. 3a), this vector $[d''_{0,j} \ldots d''_{l,j} \ldots d''_{Q-1,j}]^T$ is subjected to an FFT of dimension Q·Q, thereby giving a vector $[d'_{0,j} \ldots d'_{l,j} \ldots d'_{Q-1,j}]^T$ (FIG. 3b), each component $d'_{l,j}$ of this vector $[d'_{0,j} \ldots d'_{l,j} \ldots d'_{Q-1,j}]^T$ is multiplied by a so-called "postdemodulation" factor equal to $$Q\sqrt{2} \, e^{i\frac{2\pi}{Q}l\left(k - \frac{\lambda-1}{2} + \frac{Q}{4}\right)} e^{-i\frac{\pi}{2}(j-\alpha)},$$

thereby ultimately giving the, real, component $d_{l,j}$ of the vector $[d_{0,j} \ldots d_{l,j} \ldots d_{Q-1,j}]^T$ (FIG. 3c).

Figure 4:
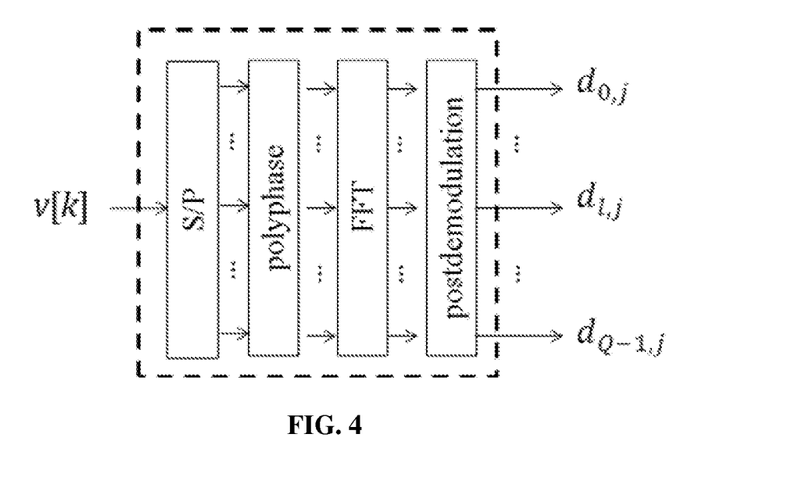

FIG. 4 summarizes the steps of reception/demodulation of an OFDM/OQAM multiplex which are described succinctly hereinabove.

To finish, it will be noted, on the basis of equation (2) hereinabove, that if zero values are systematically chosen for the QAM symbols corresponding to an even sub-carrier number l, then there is no need to take into account the sub-carriers of even number, and if zero values are systematically chosen for the QAM symbols corresponding to an odd sub-carrier number l, then there is no need to take into account the sub-carriers of odd number. Thus, in both these cases, the effective number of sub-carriers is Q/2, which may be even or odd. It is therefore seen that the number (designated by L within the framework of the present invention) of sub-carriers which is used to implement an OFDM/OQAM modulation may either be even or odd.

Figure 5:
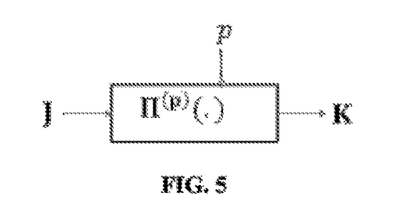

FIG. 5 schematically represents a circular permutation $\pi^{(p)}$, where $p=0, 1, \ldots, N-1$, used by the invention. With any source vector $$J = \begin{bmatrix} J_0 \\ \vdots \\ J_n \\ \vdots \\ J_{N-1} \end{bmatrix},$$

of length N, is associated by definition a target vector $$K = \prod^{(p)}(J) = \begin{bmatrix} J_{f(0,p)} \\ \vdots \\ J_{f(n,p)} \\ \vdots \\ J_{f(N-1,p)} \end{bmatrix},$$

where f is a "circulation function" of the form $$f(n,p)=(n+r(p))\mod[N], \text{ where } r=p+c \text{ or } r=-p+c, \quad (12)$$

and where c is a predetermined relative integer.

We shall now describe a method for transmitting data according to an embodiment of the invention, in which coded data are transmitted on each of the L sub-carriers of an OFDM/OQAM multiplex. As a variant, it would be possible to take into account just one, or a subset, of these sub-carriers.

Figure 6:
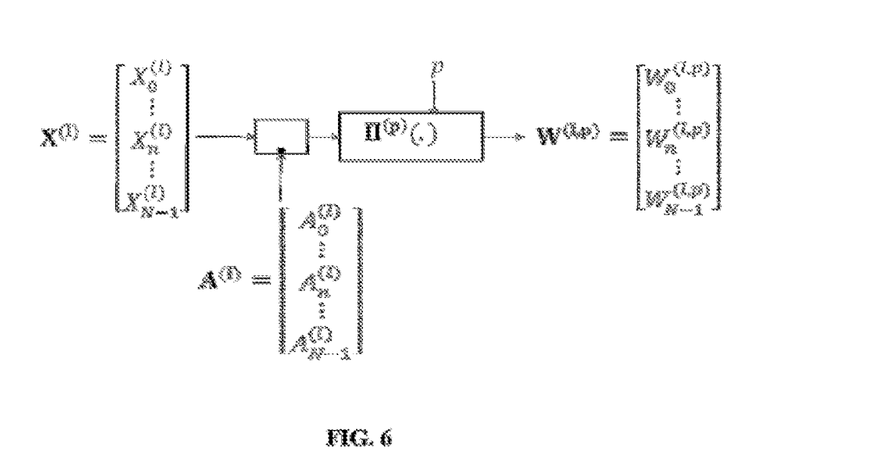

In this embodiment, the transmitter implements, for each integer l, where $0 \leq l \leq L-1$, N successive steps (where N is the number of receive antennas). Each step number p, where $p=0, 1, \ldots, N-1$, comprises the following sub-steps:

During a sub-step E1_p, illustrated in FIG. 6, a data vector $X^{(l)}$ with N components, and associated with sub-carrier number l, is transformed into a "coded data vector"

$$W^{(l,p)} \equiv \begin{bmatrix} W_0^{(l,p)} \\ \vdots \\ W_n^{(l,p)} \\ \vdots \\ W_{N-1}^{(l,p)} \end{bmatrix} = \prod^{(p)}(A^{(l)} \cdot X^{(l)}), \quad (13)$$

where $A^{(l)}$ is a predetermined coding vector with N non-zero components, and where the notation "U·V" designates the result of a term by term multiplication of two vectors U and V of the same length; stated otherwise, if the vectors U and V are of length Λ, we define:

$$U \cdot V \equiv \begin{bmatrix} U_0 V_0 \\ \vdots \\ U_n V_n \\ \vdots \\ U_{\Lambda-1} V_{\Lambda-1} \end{bmatrix}.$$

The components of the coded vector are therefore equal to $$W_n^{(l,p)} = A_{f(n,p)}^{(l)} X_{f(n,p)}^{(l)},$$

where $n \in [0, N-1]$, and f is the circulation function defined hereinabove.

As mentioned hereinabove, it is conveniently possible to choose this coding vector $A^{(l)}$:

either in such a way that all its components are equal to one another, or, in the case where the number of receive antennas N is even, in such a way that its components of even indices are equal to one another, and its components of odd indices are equal to one another and opposite to the components of even indices.

Other choices are naturally possible for the coding vector $A^{(l)}$.

During a sub-step E2_p, the transmitter transmits, on each of the M transmit antennas and on sub-carrier number l, for $0 \leq l \leq L-1$, of the OFDM/OQAM multiplex, the coded data vector $W^{(l,p)}$, with a Time Reversal precoding destined for the receiver.

It is recalled in this regard that a radio signal transmitted by a transmit antenna undergoes deformations as a function of the propagation conditions between this transmit antenna and a receive antenna. In order to limit these deformations, the signal is previously distorted by applying so-called "precoding" coefficients, as a function of the characteristics of the propagation channel between these two antennas. To do so, it is therefore necessary to determine the characteristics of this propagation channel in the frequency band concerned.

Among the existing precoding schemes we distinguish the schemes implementing the technique termed "Time Reversal", on account of its reduced complexity, of its performance and of its intrinsic capacity to focus a radio wave on a receive antenna. By focusing the energy of the signal transmitted over time and in space, Time Reversal makes it possible to appreciably reduce the dispersion caused by the propagation channel.

Time Reversal is a technique (originally used in the field of acoustic waves) which relies on the time-reversal-invariance of the wave equation. Thus, a temporally reversed wave propagates as a direct wave which would rewind time. When a brief pulse transmitted by a point of origin propagates in a propagation medium, and a part of this wave received by a recipient point is reversed temporally before being returned in the propagation medium, the wave converges to the point of origin, reforming a brief pulse there. The signal gathered at the point of origin is almost identical in its shape to the signal of origin transmitted by the point of origin.

The Time Reversal technique has been applied to radio communication networks to cancel the effect of the propagation channel on the signal received by a receiving antenna, in particular by reducing the spreading of the channel by concentration of the energy at a focal point where this receiving antenna is situated and by reducing the temporal spreading (known as "delay spread") of the signal received, as well as to simplify the processing of symbols received after passing through the channel. Accordingly, the signal transmitted by a transmitting antenna is pre-equalized by applying coefficients obtained on the basis of the time-reversal of the impulse response of the propagation channel that this signal must pass through.

In this instance, this entails, on the one hand, focusing the component $W_n^{(l,p)}$, where $n \in [0, N-1]$, on receive antenna number n, and on the other hand, maximizing the data bitrate between the transmitter and the receiver, for a given power of the transmitter. The transmission is implemented simultaneously on all the transmitting antennas.

Here, by way of examples, are two possible variants for this transmission of the coded data vector $W^{(l,p)}$ with a Time Reversal precoding.

Figure 7:
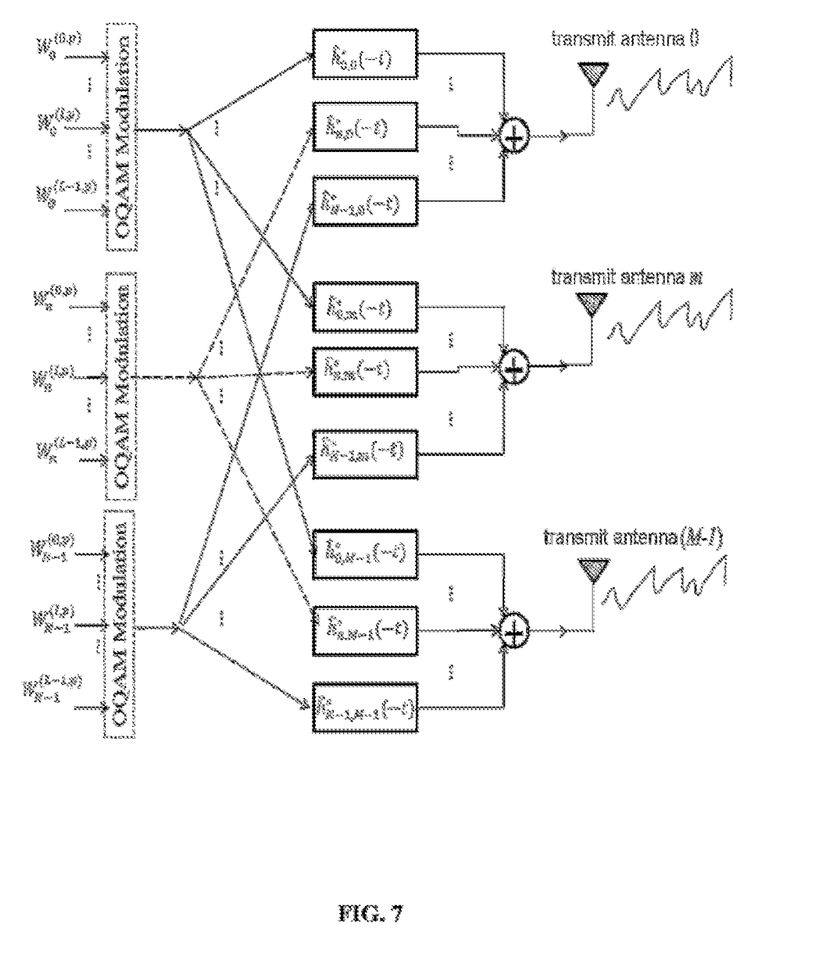
FIG. 7 illustrates the transmission of said coded data vector on a sub-carrier and on the whole set of transmit antennas, with a Time Reversal precoding carried out by means of a temporal filter, according to a first variant of the invention.

According to a first variant, the Time Reversal precoding is carried out by means of a temporal filter. FIG. 7 illustrates this transmission on a sub-carrier and on the whole set of transmit antennas.

Let $h_{nm}(t)$ be the impulse response of the channel between transmit antenna number m, where $m \in [0, M-1]$, and receive antenna number n, and let $\hat{h}_{nm}(t)$ be an estimation of $h_{nm}(t)$.

The signal transmitted on transmit antenna number m is filtered by means of the Time Reversal filter $\hat{h}*_{nm}(-t)$.

Figure 8:
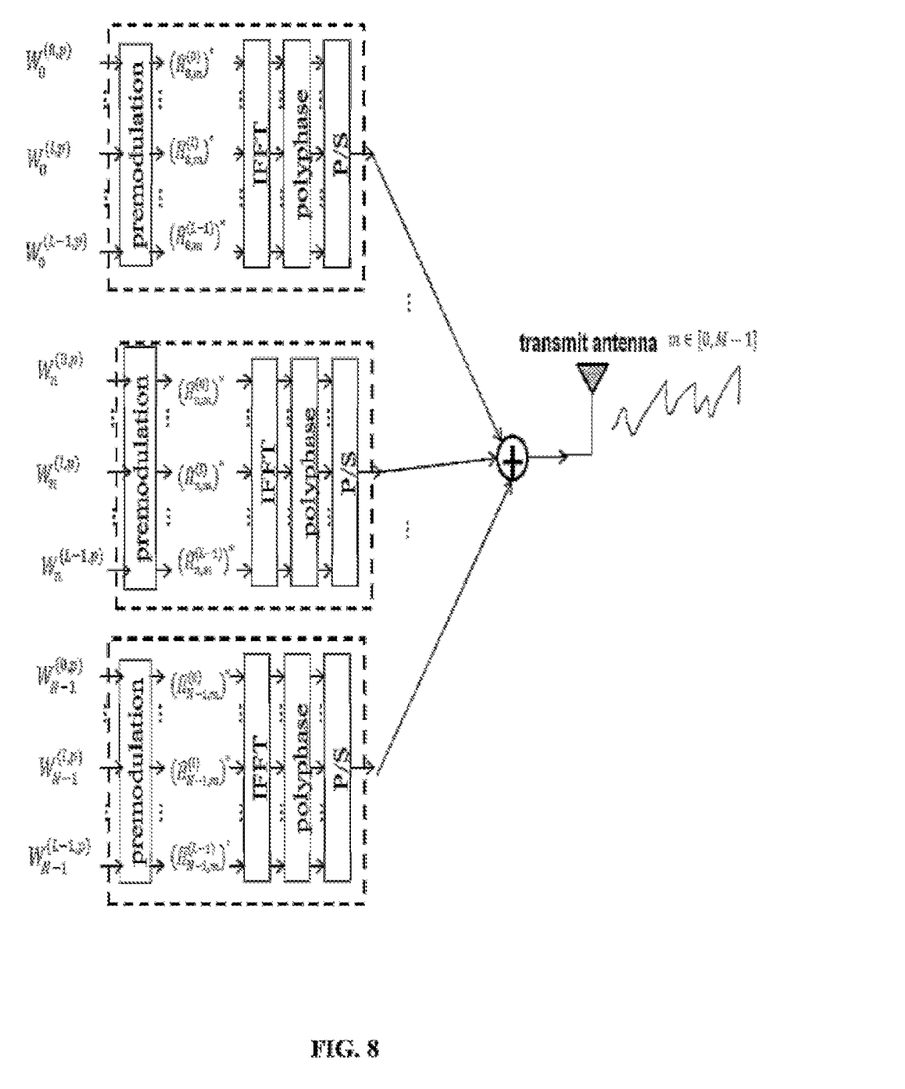
FIG. 8 illustrates the transmission of said coded data vector on a transmit antenna and on the whole set of sub-carriers, with a Time Reversal precoding carried out by means of a frequency filter, according to a second variant of the invention.

According to a second variant, the Time Reversal precoding is carried out by means of a frequency filter. FIG. 8 illustrates this transmission on a transmit antenna and on the whole set of sub-carriers.

Let $H_{mn}^{(l)}$ be the coefficient of the transfer matrix of the channel between transmit antenna number m and receive antenna number n on sub-carrier l, and let $\hat{H}_{mn}^{(l)}$ be an estimation of this coefficient.

The signal transmitted on transmit antenna number m on sub-carrier l is filtered by means of a Time Reversal precoding coefficient equal to $(\hat{H}_{mn}^{(l)})*$.

We shall now describe a method for receiving data according to an embodiment of the invention, in which decoded data associated with each of the L sub-carriers are obtained. As a variant, it would be possible to take into account just one, or a subset, of these sub-carriers.

The receiver implements firstly N steps (where N is the number of receive antennas). It is assumed here that the transmitter and the receiver are synchronized by means of a conventional technique, in such a way that the symbol times applied by the transmitter and the receiver are equal, and that said N steps are implemented in parallel at the transmitter level and at the receiver level.

Each step number p, where p=0, 1, . . . , N−1, comprises the following sub-steps.

Figure 9:
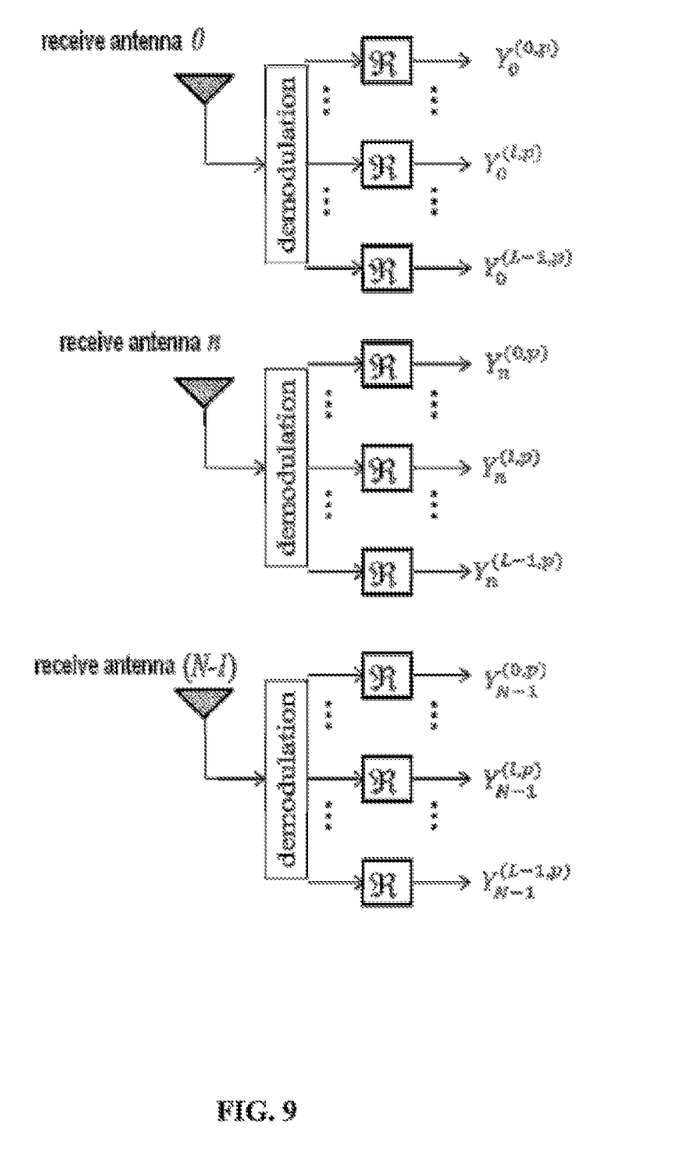
FIG. 9 represents the determination by the receiver of a vector received with N real components for each sub-carrier of the OFDM/OQAM multiplex, according to an embodiment of the invention.

During a sub-step R1_p, illustrated in FIG. 9, the receiver determines, for each sub-carrier l, where $0 \le l \le L-1$, a "received vector" $Y^{(l,p)}$ with N real components, whose n-th component, where n=1, 2, . . . , N, is equal to the symbol associated with the sub-carrier l received on the n-th receive antenna, after OFDM/OQAM demodulation and extraction of the real part.

Figure 10:
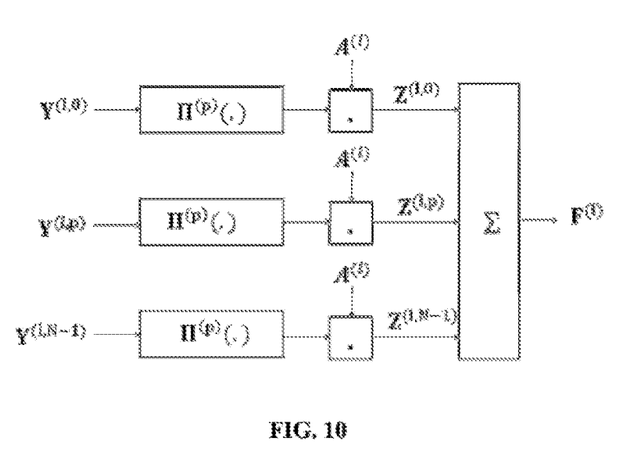
FIG. 10 represents the coding by the receiver of the vector received on a sub-carrier of the OFDM/OQAM multiplex, so as to obtain a coded received vector, according to an embodiment of the invention.

During a sub-step R2_p, illustrated in FIG. 10, the receiver codes each of said received vectors $Y^{(l,p)}$, so as to obtain a "coded received vector"

$$Z^{(l,p)} = \begin{bmatrix} Z_0^{(l,p)} \\ \vdots \\ Z_n^{(l,p)} \\ \vdots \\ Z_{N-1}^{(l,p)} \end{bmatrix} = A^{(l)} \cdot \left( \prod^{(p)} (Y^{(l,p)}) \right). \quad (14)$$

Stated otherwise:

$$Z_n^{(l,p)} = A_n^{(l)} Y_{f(n,p)}^{(l)},$$

where $n \in [0, N-1]$, f is the circulation function defined hereinabove, and $A^{(l)}$ is the coding vector mentioned hereinabove.

Once these N steps have been completed, the receiver calculates, for $0 \le l \le L-1$, during a step R3, the "decodable vector" $F^{(l)}$ by summing over the various receive antennas the corresponding coded vectors received:

$$F^{(l)} = \sum_{p=0}^{N-1} Z^{(l,p)}, \quad (15)$$

as illustrated also in FIG. 10. Stated otherwise:

$$Z_n^{(l,p)} = A_n^{(l)} Y_{f(n,p)}^{(l)},$$

where $n \in [0, N-1]$.

Finally, during a step R4, the receiver calculates, for $0 \le l \le L-1$, the "decoded data vector":

$$T^{(l)} = S^{(l)} \cdot F^{(l)}, \quad (16)$$

where the decoding matrix $$S^{(l)} = (R^{(l)})^{-1} \quad (17)$$

is obtained by inverting the matrix $R^{(l)}$ of the equivalent channel between the transmitter and the receiver. By definition, "matrix of the equivalent channel" is understood to mean the matrix $R^{(l)}$ such that:

$$F^{(l)} = R^{(l)} \cdot X^{(l)} + B^{(l)}, \quad (18)$$

where $B^{(l)}$ is a thermal noise term.

It can indeed be shown that this matrix $R^{(l)}$ is always invertible. The inversion of the matrix $R^{(l)}$ is of course particularly easy when $R^{(l)}$ is diagonalizable, in particular when $R^{(l)}$ is a circulant matrix. Now, it can be shown that a circulant matrix is in fact obtained in the following two practical cases:

either the coding vector $A^{(l)}$ is such that all its components are equal to one another, or, in the case where the number of receive antennas N is even, the coding vector $A^{(l)}$ is such that its components of even indices are equal to one another, and its components of odd indices are equal to one another and opposite to the components of even indices.

It can also be shown that (theoretically) the decoded data vector $T^{(l)}$ thus obtained is equal to the data vector $X^{(l)}$ transmitted, without any interference between the decoded symbols.

To finish, we shall describe, by way of examples, two schemes for estimating the matrix $R^{(l)}$.

According to a first variant, the estimation of $R^{(l)}$ is obtained by calculation.

This calculation-based scheme requires that the receiver know an estimation $\hat{H}^{(l)}$ of the transfer matrix of the MIMO channel for the sub-carrier l. This estimation can be obtained by any conventional means.

Figure 11:
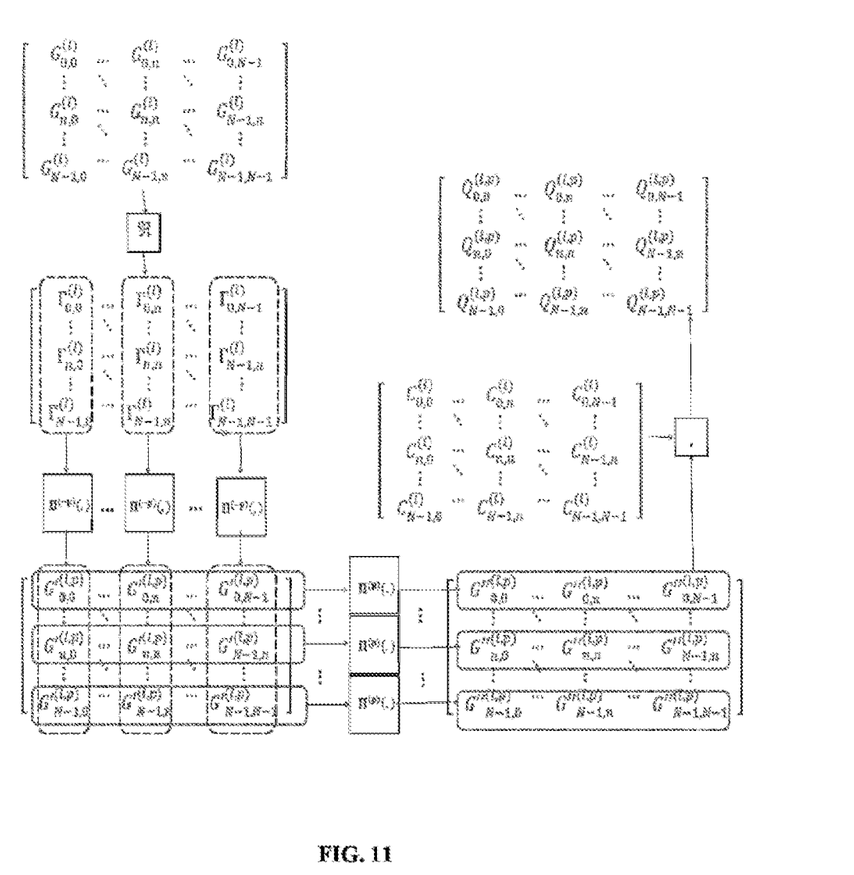
FIG. 11 represents the calculation of the matrix of the equivalent MIMO channel between the transmitter and the receiver for a sub-carrier of the OFDM/OQAM multiplex, according to a variant of the invention.

As illustrated in FIG. 11, the receiver performs the following steps:

calculation of the matrix $G^{(l)} = \hat{H}^{(l)} \cdot (\hat{H}^{(l)})^H$, where the exponent H designates the conjugate transpose, calculation of the matrix $\Gamma^{(l)} = \Re\{G^{(l)}\}$, calculation of the matrix $C^{(l)} = A^{(l)} (A^{(l)})^T$, N successive steps of index p from 0 to (N−1), each step comprising:

a step of calculating a matrix $G'^{(l,p)}$ whose n-th column vector is obtained by applying $\pi^{(-p)}(.)$ to the n-th column vector of $\Gamma^{(l)}$, a step of calculating a matrix $G''^{(l,p)}$ whose n-th row vector is obtained by applying $\pi^{(p)}(.)$ to the n-th row vector of $G'^{(l,p)}$, and calculation of the matrix $Q^{(l,p)} = C^{(l)} \cdot G''^{(l,p)}$.

For any $p \in [0, N-1]$, the matrix $Q^{(l,p)}$ thus obtained has components: $Q_{nm}^{(l,p)} = A_n^{(l)} A_m^{(l)} \Re\{G_{f(n,p)f(m,-p)}^{(l)}\}$, where $n \in [0, N-1]$ and $m \in [0, N-1]$.

We thus ultimately obtain:

$$R^{(l)} = \sum_{p=0}^{N-1} Q^{(l,p)}.$$

According to a second variant, the estimation of $R^{(l)}$ is obtained by measurements carried out with the aid of pilot signals.

This scheme requires a prior step of transmission/reception of coded pilots. The advantage of this scheme is that the receiver does not have to estimate the transfer matrix H in OQAM (complex operation), and does not need to calculate the matrix $R^{(l)}$, which here is measured directly by the receiver.

The transmitter and the receiver implement the following steps for q going from 0 to (N−1).

The transmitter processes, for each sub-carrier l, where $0 \le l \le L-1$, a real data vector $Xpilot^{(q,l)}$ known to the receiver, of size $N \ge 2$, all of whose components are zero with the exception of $Xpilot^{(q,l)}(q)$, following N successive steps of index p from 0 to (N−1), each step p comprising:

a step of coding the data vector $Xpilot^{(q,l)}$ into a coded vector $Wpilot^{(q,l,p)} = \pi^{(p)}(A^{(l)}, X^{(q,l)})$, and a step of transmitting the coded vector $Wpilot^{(q,l,p)}$ destined for the receiver, with a Time Reversal precoding so as to focus the n-th element of $Wpilot^{(q,l,p)}$ on the n-th receive antenna.

The receiver implements, for each sub-carrier l, where $0 \le l \le L-1$, the following steps:

N successive steps of index p from 0 to (N−1), each step p comprising:

a step of determining a received vector $Y^{(q,l,p)}$ composed of the symbols received on the N receive antennas, after OQAM demodulation and extraction of the real part, and a step of coding the received vector $Y^{(q,l,p)}$ into a coded received vector $Z^{(q,l,p)} = A^{(l)} \cdot (\pi^{(p)}(Y^{(q,l,p)}))$, and a step of calculating a decodable vector $$Fpilot^{(q,l)} = \sum_{p=0}^{N-1} Z^{(q,l,p)}.$$

Finally, the receiver calculates the components of the matrix $R^{(l)}$ of the equivalent channel in the following manner:

$$R^{(l)}(n,q) = Fpilot^{(q,l)}(n) / Xpilot^{(q,l)}(n),$$

for $0 \le n \le N-1$ and $0 \le q \le N-1$.

It will be noted that when $R^{(l)}$ is a circulant matrix, it suffices to process $Xpilot^{(q,l)}$ for q=0 as described hereinabove; it is not necessary to process $Xpilot^{(q,l)}$ for $1 \le q \le N-1$, since the columns of $R^{(l)}$ are deduced from one another by circulation.

As mentioned hereinabove, the present invention also relates to a computerized system implementing the method of wireless transmission, or the method of wireless reception, or the method of wireless communication that are described hereinabove. This computerized system comprises in a conventional manner a central processing unit controlling by signals a memory, as well as an input unit and an output unit. Moreover, this computerized system can be used to execute a computer program comprising instructions for the implementation of any one of the methods according to the invention.

Indeed, the invention is also aimed at a computer program downloadable from a communication network comprising instructions for the execution of the steps of a method according to the invention, when it is executed on a computer. This computer program can be stored on a medium readable by computer and can be executable by a microprocessor.

This program can use any programming language, and take the form of source code, object code, or of code intermediate between source code and object code, such as in a partially compiled form, or in any other desirable form.

The invention is also aimed at an irremovable, or partially or totally removable, information medium readable by a computer, and comprising instructions of a computer program such as mentioned hereinabove.

The information medium can be any entity or device capable of storing the program. For example, the medium can comprise a storage means, such as a ROM, for example a CD ROM or a microelectronic circuit ROM, or a magnetic recording means, such as a hard disk, or else a USB key (known as a "USB flash drive").

Moreover, the information medium can be a transmissible medium such as an electrical or optical signal, which can be conveyed via an electrical or optical cable, by radio or by other means. The computer program according to the invention can be in particular downloaded to a network of Internet type.

As a variant, the information medium can be an integrated circuit in which the program is incorporated, the circuit being tailored to execute or to be used in the execution of any one of the methods according to the invention.

Although the present disclosure has been described with reference to one or more examples, workers skilled in the art will recognize that changes may be made in form and detail without departing from the scope of the disclosure and/or the appended claims.

The invention claimed is:

1. A method of wireless transmission, comprising:
transmitting, by a transmitter furnished with $M \ge 1$ transmit antenna(s), data to a receiver furnished with $N \ge 2$ receive antennas, in which said data are transmitted by using an OFDM/OQAM modulation comprising $L \ge 1$ sub-carriers, wherein, for at least one value of the integer l, where $0 \le l \le L-1$, said transmitter implements N steps, step number p, where p=0, 1, ..., N−1, comprising the following sub-steps:
coding of a data vector $X^{(l)}$ with N real components into a coded data vector $W^{(l,p)} = \pi^{(p)}(A^{(l)}, X^{(l)})$, where $A^{(l)}$ is a predetermined coding vector with N non-zero components, the notation "U·V" designates the result of the term by term multiplication of two vectors U and V of the same length, and $\pi^{(p)}(U)$ designates the circular permutation by r places of the components of a vector U, where r=p+c or r=−p+c, and c is a predetermined relative integer, and
transmission of said coded data vector $W^{(l,p)}$ on each of the M transmit antennas on the sub-carrier l, with a Time Reversal precoding using an estimation $\hat{H}^{(l)}$ of the transfer matrix of the MIMO channel which links said transmitter to said receiver for the sub-carrier l and focusing the n-th component of the coded data vector $W^{(l,p)}$, where n=1, 2, ..., N, on the n-th receive antenna.

2. The method of wireless transmission as claimed in claim 1, wherein said coding vector $A^{(l)}$ is such that all its components are equal to one another.

3. The method of wireless transmission as claimed in claim 1, wherein the number of receive antennas N is even, and said coding vector $A^{(l)}$ is such that its components of even indices are equal to one another, and its components of odd indices are equal to one another and opposite to the components of even indices.

4. A method of wireless reception by a receiver furnished with $N \ge 2$ receive antennas, in which the data received have been transmitted using an OFDM/OQAM modulation comprising $L \ge 1$ sub-carriers, wherein, for at least one value of the integer l, where $0 \le l \le L-1$:

a) said receiver implements firstly N steps, step number p, where p=0, 1, . . . , N−1, comprising the following sub-steps:

determination of a received vector $Y^{(l,p)}$ with N real components, whose n-th component, where n=1, 2, . . . , N, is equal to the symbol associated with the sub-carrier l received on the n-th receive antenna, after OFDM/OQAM demodulation and extraction of the real part, and coding of said received vector $Y^{(l,p)}$ into a coded received vector $$Z^{(l,p)}=A^{(l)}\cdot(\pi^{(p)}(Y^{(l,p)})),$$

where $A^{(l)}$ is a predetermined coding vector with N non-zero components, the notation "U·V" designates the result of the term by term multiplication of two vectors U and V of the same length, $\pi^{(p)}(U)$ designates the circular permutation by r places of the components of a vector U, where r=p+c or r=−p+c, and c is a predetermined relative integer, b) the receiver calculates a decodable vector $$F^{(l)}=\Sigma_{p=0}^{N-1}Z^{(l,p)},\text{ and}$$

c) the receiver calculates a decoded data vector $T^{(l)}$ as follows:

$$T^{(l)}=S^{(l)}\cdot F^{(l)},$$

where $S^{(l)}=(R^{(l)})^{-1}$ and $R^{(l)}$ is the matrix of the equivalent MIMO channel between the transmitter and the receiver for the sub-carrier l, defined by $$F^{(l)}=R^{(l)}\cdot X^{(l)}+B^{(l)},$$

where $B^{(l)}$ is a thermal noise term.

5. The method of wireless reception as claimed in claim 4, wherein said coding vector $A^{(l)}$ is such that all its components are equal to one another.

6. The method of wireless reception as claimed in claim 4, wherein the number of receive antennas N is even, and said coding vector $A^{(l)}$ is such that its components of even indices are equal to one another, and its components of odd indices are equal to one another and opposite to the components of even indices.

7. The method of wireless communication as claimed in claim 1, further comprising:

receiving the data, by the receiver, wherein, for at least one value of the integer l, where 0≤l≤L−1, receiving comprises:

a) the receiver implements firstly N steps, where step number p comprises the following sub-steps:

determining a received vector $Y^{(l,p)}$ with N real components, whose n-th component, where n=1, 2, . . . , N, is equal to the symbol associated with the sub-carrier l received on the n-th receive antenna, after OFDM/OQAM demodulation and extraction of the real part, and coding said received vector $Y^{(l,p)}$ into a coded received vector $$Z^{(l,p)}=A^{(l)}\cdot(\pi^{(p)}(Y^{(l,p)})),$$

b) the receiver calculates a decodable vector $$\_F^{(l)}=\Sigma_{p=0}^{N-1}Z^{(l,p)},\text{ and}$$

c) the receiver calculates a decoded data vector $T^{(l)}$ as follows:

$$T^{(l)}=S^{(l)}\cdot F^{(l)},$$

wherein $S^{(l)}=(R^{(l)})^{-1}$ and $R^{(l)}$ is the matrix of the equivalent MIMO channel between the transmitter and the receiver for the sub-carrier l, defined by $$F^{(l)}=R^{(l)}\cdot X^{(l)}+B^{(l)},$$

wherein $B^{(l)}$ is a thermal noise term, and wherein said steps number p are synchronized between the transmitter and the receiver.

8. A wireless transmitter comprising:

M≥1 transmit antenna(s);

means for transmitting data intended for a receiver furnished with N≥2 receive antennas by using an OFDM/OQAM modulation comprising L≥1 sub-carriers; and for at least one value of the integer l, where 0≤l≤L−1, said transmitter furthermore comprises means for:

coding, for p=0, 1, . . . , N−1, a data vector $X^{(l)}$ with N real components into a coded data vector $W^{(l,p)}=\pi^{(p)}(A^{(l)}, X^{(l)})$, where $A^{(l)}$ is a predetermined coding vector with N non-zero components, the notation "U·V" designates the result of the term by term multiplication of two vectors U and V of the same length, and $\pi^{(p)}(U)$ designates the circular permutation by r places of the components of a vector U, where r=p+c or r=−p+c, and c is a predetermined relative integer, and transmitting, for p=0, 1, . . . , N−1, said coded data vector $W^{(l,p)}$ on each of the M transmit antennas on the sub-carrier l, with a Time Reversal precoding using an estimation $\hat{H}^{(l)}$ of the transfer matrix of the MIMO channel which links said transmitter to said receiver for the sub-carrier l and focusing the n-th component of the coded data vector $W^{(l,p)}$, where n=1, 2, . . . , N, on the n-th receive antenna.

9. A wireless receiver comprising:

N≥2 receive antennas;

means for receiving data which have been transmitted by means of an OFDM/OQAM modulation comprising L≥1 sub-carriers; and for at least one value of the integer l, where 0≤l≤L−1, the receiver furthermore comprises means for:

determining, for p=0, 1, . . . , N−1, a received vector $Y^{(l,p)}$ with N real components, whose n-th component, where n=1, 2, . . . , N, is equal to the symbol associated with the sub-carrier l received on the n-th receive antenna, after OFDM/OQAM demodulation and extraction of the real part, coding, for p=0, 1, . . . , N−1, said received vector $Y^{(l,p)}$ into a coded received vector $$Z^{(l,p)}=A^{(l)}\cdot(\pi^{(p)}(Y^{(l,p)})),$$

where $A^{(l)}$ is a predetermined coding vector with N non-zero components, the notation "U·V" designates the result of the term by term multiplication of two vectors U and V of the same length, $\pi^{(p)}(U)$ designates the circular permutation by r places of the components of a vector U, where r=p+c or r=−p+c, and c is a predetermined relative integer, calculating a decodable vector $$F^{(l)}=\Sigma_{p=0}^{N-1}Z^{(l,p)},\text{ and}$$

calculating a decoded data vector $T^{(l)}$ as follows:

$$T^{(l)}=S^{(l)}\cdot F^{(l)},$$

where $S^{(l)}=(R^{(l)})^{-1}$ and $R^{(l)}$ is the matrix of the equivalent MIMO channel between the transmitter and the receiver for the sub-carrier l, defined by $$F^{(l)}=R^{(l)}\cdot X^{(l)}+B^{(l)},$$

where $B^{(l)}$ is a thermal noise term.

10. An irremovable, or partially or totally removable non-transitory computer-readable medium for storing data, comprising computer program code instructions for the execution of the steps of a method of wireless transmission when executed by a processor, by a transmitter furnished with M≥1 transmit antenna(s), of data intended for a receiver furnished with N≥2 receive antennas, in which said data are transmitted by using an OFDM/OQAM modulation comprising $L \geq 1$ sub-carriers, wherein, for at least one value of the integer l, where $0 \leq l \leq L-1$, said transmitter implements N steps, step number p, where $p=0, 1, \ldots, N-1$, comprising the following sub-steps:
- coding a data vector $X^{(l)}$ with N real components into a coded data vector $W^{(l,p)} = \pi^{(p)}(A^{(l)}, X^{(l)})$, where $A^{(l)}$ is a predetermined coding vector with N non-zero components, the notation "U·V" designates the result of the term by term multiplication of two vectors U and V of the same length, and $\pi^{(p)}(U)$ designates the circular permutation by r places of the components of a vector U, where $r=p+c$ or $r=-p+c$, and c is a predetermined relative integer, and
- transmitting said coded data vector $W^{(l,p)}$ on each of the M transmit antennas on the sub-carrier l, with a Time Reversal precoding using an estimation $\hat{H}^{(l)}$ of the transfer matrix of the MIMO channel which links said transmitter to said receiver for the sub-carrier l and focusing the n-th component of the coded data vector $W^{(l,p)}$, where $n=1, 2, \ldots, N$, on the n-th receive antenna.

11. An irremovable, or partially or totally removable non-transitory computer-readable medium for storing data, comprising computer program code instructions for execution of a method of wireless reception, when executed by a processor, by a receiver furnished with $N \geq 2$ receive antennas, in which the data received have been transmitted using an OFDM/OQAM modulation comprising $L \geq 1$ sub-carriers, wherein, for at least one value of the integer l, where $0 \leq l \leq L-1$:

a) said receiver implements firstly N steps, step number p, where $p=0, 1, \ldots, N-1$, comprising the following sub-steps:
- determination of a received vector $Y^{(l,p)}$ with N real components, whose n-th component, where $n=1, 2, \ldots, N$, is equal to the symbol associated with the sub-carrier l received on the n-th receive antenna, after OFDM/OQAM demodulation and extraction of the real part, and coding of said received vector $Y^{(l,p)}$ into a coded received vector $$Z^{(l,p)} = A^{(l)} \cdot (\pi^{(p)}(Y^{(l,p)})),$$

where $A^{(l)}$ is a predetermined coding vector with N non-zero components, the notation "U·V" designates the result of the term by term multiplication of two vectors U and V of the same length, $\pi^{(p)}(U)$ designates the circular permutation by r places of the components of a vector U, where $r=p+c$ or $r=-p+c$, and c is a predetermined relative integer, b) the receiver calculates a decodable vector $$F^{(l)} = \Sigma_{p=0}^{N-1} Z^{(l,p)}, \text{ and}$$

c) the receiver calculates a decoded data vector $T^{(l)}$ as follows:

$$T^{(l)} = S^{(l)} \cdot F^{(l)},$$

where $S^{(l)} = (R^{(l)})^{-1}$ and $R^{(l)}$ is the matrix of the equivalent MIMO channel between the transmitter and the receiver for the sub-carrier l, defined by $$F^{(l)} = R^{(l)} \cdot X^{(l)} + B^{(l)},$$

where $B^{(l)}$ is a thermal noise term.

* * * * *